United States Patent
Kim et al.

(10) Patent No.: US 10,091,631 B2
(45) Date of Patent: Oct. 2, 2018

(54) METHOD OF TRANSMITTING AND RECEIVING SIGNAL IN WIRELESS COMMUNICATION SYSTEM AND APPARATUS THEREFOR

(71) Applicant: LG ELECTRONICS INC., Seoul (KR)

(72) Inventors: Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/123,613

(22) PCT Filed: Apr. 4, 2016

(86) PCT No.: PCT/KR2016/003466
§ 371 (c)(1),
(2) Date: Sep. 2, 2016

(87) PCT Pub. No.: WO2016/159740
PCT Pub. Date: Oct. 6, 2016

(65) Prior Publication Data
US 2018/0176753 A1     Jun. 21, 2018

Related U.S. Application Data

(60) Provisional application No. 62/142,498, filed on Apr. 3, 2015.

(51) Int. Cl.
*H04W 72/04* (2009.01)
*H04W 4/70* (2018.01)
(Continued)

(52) U.S. Cl.
CPC .......... *H04W 4/70* (2018.02); *H04W 72/042* (2013.01); *H04W 72/044* (2013.01); *H04W 88/02* (2013.01); *H04W 88/08* (2013.01)

(58) Field of Classification Search
CPC .......... H04W 72/042; H04W 72/0453; H04W 48/16; H04W 4/70; H04W 72/0413; H04W 72/048; H04W 72/121; H04W 72/1289
See application file for complete search history.

(56) References Cited

U.S. PATENT DOCUMENTS

2005/0249266 A1   11/2005  Brown et al.
2007/0280166 A1*  12/2007  Jung .................. H04B 1/713
                                                   370/331
(Continued)

FOREIGN PATENT DOCUMENTS

JP   WO2011016252   1/2013
JP      2014531856   11/2014
(Continued)

OTHER PUBLICATIONS

Moroga, H. et al., "Performance Evaluation of PDSCH for LTE-Advanced Low Complexitiy MTC," NTT DOCOMO Inc., Nov. 2017, 5 pages.

(Continued)

*Primary Examiner* — Sai Aung
(74) *Attorney, Agent, or Firm* — Lee, Hong, Degerman, Kang & Waimey

(57) ABSTRACT

According to one embodiment of the present invention, a method of receiving a downlink signal by a machine type communication user equipment (MTC UE) in a wireless communication system can comprise obtaining frequency hopping information on a plurality of subbands included in a downlink band and repeatedly receiving the downlink signal via different subbands based on the frequency hopping information. In this case, the downlink band includes $$\left\lfloor \frac{N_{RB}}{6} \right\rfloor$$

(Continued)

number of subbands each configured as 6 resource block (RB) size and '$N_{RB}$' corresponds to a size of the downlink band. If a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band may be configured as the remaining band.

16 Claims, 13 Drawing Sheets

(51) Int. Cl.
    *H04W 88/08* (2009.01)
    *H04W 88/02* (2009.01)

(56) References Cited

U.S. PATENT DOCUMENTS

2009/0316758 A1   12/2009   Ahn et al.
2012/0120888 A1*   5/2012   Miao ..................... H04B 1/7143
                                                                                   370/329
2015/0282208 A1*   10/2015   Yi ........................ H04W 72/121
                                                                                    370/329

FOREIGN PATENT DOCUMENTS

| JP | 2015507889 | 3/2015 |
|---|---|---|
| KR | 1020140071480 | 6/2014 |
| WO | 2014/054887 | 4/2014 |

OTHER PUBLICATIONS

PCT International Application No. PCT/KR2016/003466, Written Opinion of the International Searching Authority dated Jul. 26, 2016, 11 pages.
NEC, "Frequency Hopping schemes for LTE Rel-13 MTC" 3GPP TSG RAN WG1 Meeting#80, R1-150286, Feb. 18, 2015, 4 pages.
Panasonic, "Consideration on Frequency Hopping for MTC UEs" 3GPP TSG RAN WG1 Meeting#79, R1-144799, Nov. 8, 2014, 3 pages.
Samsung, "Considerations of sub-band scheduling for 1.4 MHz MTC UE", 3GPP TSG RAN WG1 Meeting #80, R1-150351, Feb. 2015, 3 pages.
Nec, "Coverage enhancement for Rel-13 low complexity UEs", 3GPP TSG RAN WG1 Meeting #79, R1-144860, Nov. 2014, 4 pages.

\* cited by examiner

FIG. 12
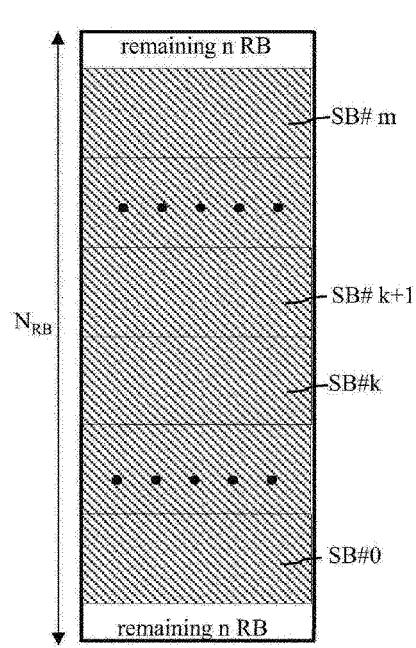
(a)
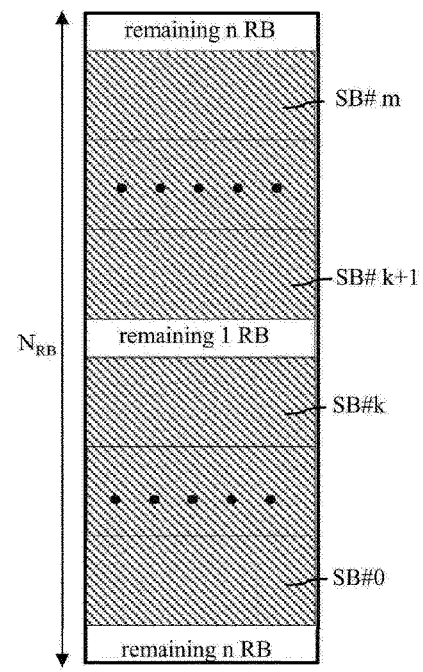
(b)

METHOD OF TRANSMITTING AND RECEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/003466, filed on Apr. 4, 2016, which claims the benefit of U.S. Provisional Application No. 62/142,498, filed on Apr. 3, 2015, the contents of which are all hereby incorporated by reference herein in their entirety.

TECHNICAL FIELD

The present invention relates to a method of transmitting or receiving an MTC signal in a wireless communication system supporting MTC (Machine Type Communication), an MTC UE performing the same and a base station.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE OF THE INVENTION

Technical Task

A technical task of the present invention is to provide a method of repeatedly transmitting or receiving an MTC signal based on frequency hopping in a wireless communication system supporting MTC and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of receiving a downlink signal by a machine type communication user equipment (MTC UE) in a wireless communication system, includes obtaining frequency hopping information on a plurality of subbands included in a downlink band and repeatedly receiving the downlink signal via different subbands based on the frequency hopping information. In this case, the downlink band includes $$\left\lfloor \frac{N_{RB}}{6} \right\rfloor$$

number of subbands each configured as 6 resource block (RB) size, '$N_{RB}$' corresponds to a size of the downlink band, '$\lfloor \; \rfloor$' corresponds to a floor function, and if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

To further achieve these and other advantages and in accordance with the purpose of the present invention, according to a different embodiment, a machine type communication user equipment (MTC UE) in a wireless communication system includes a processor configured to obtain frequency hopping information on a plurality of subbands included in a downlink band and a receiver configured to repeatedly receive the downlink signal via different subbands based on the frequency hopping information. In this case, the downlink band includes $$\left\lfloor \frac{N_{RB}}{6} \right\rfloor$$

number of subbands each configured as 6 resource block (RB) size, '$N_{RB}$' corresponds to a size of the downlink band, '$\lfloor \; \rfloor$' corresponds to a floor function, and if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

To further achieve these and other advantages and in accordance with the purpose of the present invention, according to a further different embodiment, a method of transmitting a downlink signal by a base station to an machine type communication user equipment (MTC UE) in a wireless communication system, includes the steps of transmitting frequency hopping information on a plurality of subbands included in a downlink band and repeatedly transmitting the downlink signal via different subbands based on the frequency hopping information. In this case, the downlink band includes $$\left\lfloor \frac{N_{RB}}{6} \right\rfloor$$

number of subbands each configured as 6 resource block (RB) size, '$N_{RB}$' corresponds to a size of the downlink band, '$\lfloor \ \rfloor$' corresponds to a floor function, and if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

Preferably, if the remaining band includes even number RBs, the even number RBs can be uniformly distributed to a lowest band and a highest band of the downlink band.

Preferably, the intervening RB can be allocated between a group of contiguous subbands in a lower part and a group of contiguous subbands in a higher part among the $$\left\lfloor \frac{N_{RB}}{6} \right\rfloor$$

number of subbands.

Preferably, the number of frequency hopping subbands on which the downlink signal is received can be set to 2 or 4 among the $$\left\lfloor \frac{N_{RB}}{6} \right\rfloor$$

number of subbands.

Preferably, if the downlink signal corresponds to a system information block type-x (SIB-x) other than SIB 1, where x>1, the frequency hopping information on the SIB-x can be received via the SIB 1. More preferably, the SIB 1 is repeatedly received according to frequency hopping and the frequency hopping information included in the SIB 1 can indicate whether or not frequency hopping for the SIB-x is activated and a subband on which the SIB-x is transmitted.

Preferably, the MTC UE repeatedly receives MTC physical downlink control channel (PDCCH) and repeatedly receives MTC physical downlink shared channel (PDSCH) scheduled by the MTC PDCCH. In this case, the MTC PDCCH and the MTC PDSCH can be received via different subframes and frequency hopping different subbands. More preferably, an initial frequency hopping subband at which repetitive reception of the MTC PDCCH is initiated is configured by a base station and a subband on which the MTC PDSCH is received can be determined based on a subband on which the MTC PDCCH is received.

Advantageous Effects

According to embodiments of the present invention, if frequency hopping is performed on a subband on which an MTC signal is transmitted in a wireless communication system supporting MTC, it is able to enhance performance of repeatedly transmitting and receiving an MTC signal and an MTC UE is able to transmit and receive an MTC signal even in a poor radio channel environment.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 12 illustrates an example of an MTC subband according to a further different embodiment of the present invention.

BEST MODE

Mode for Invention

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/ Enhanced Data Rates for GSM Evolution (GSM/GPRS/ EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
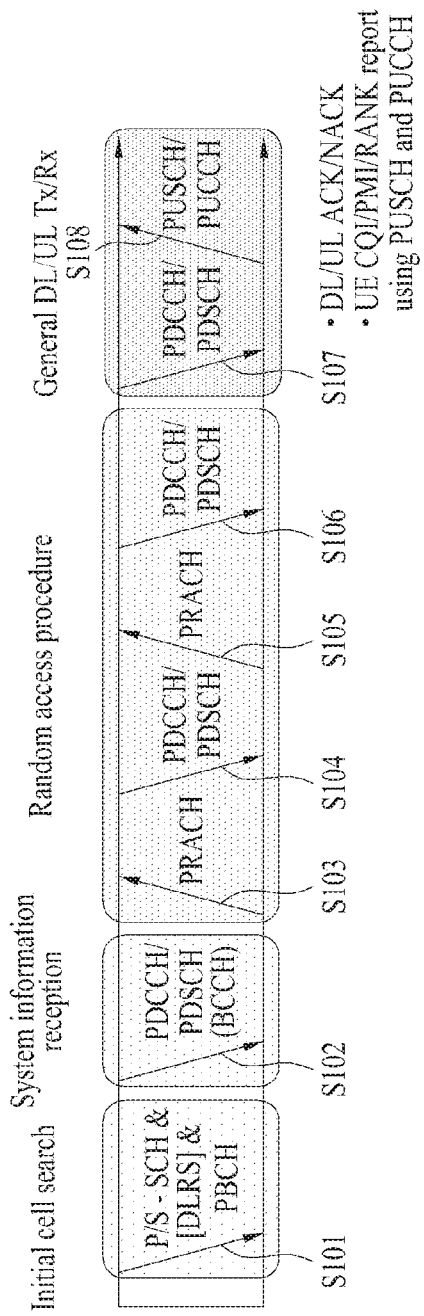
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
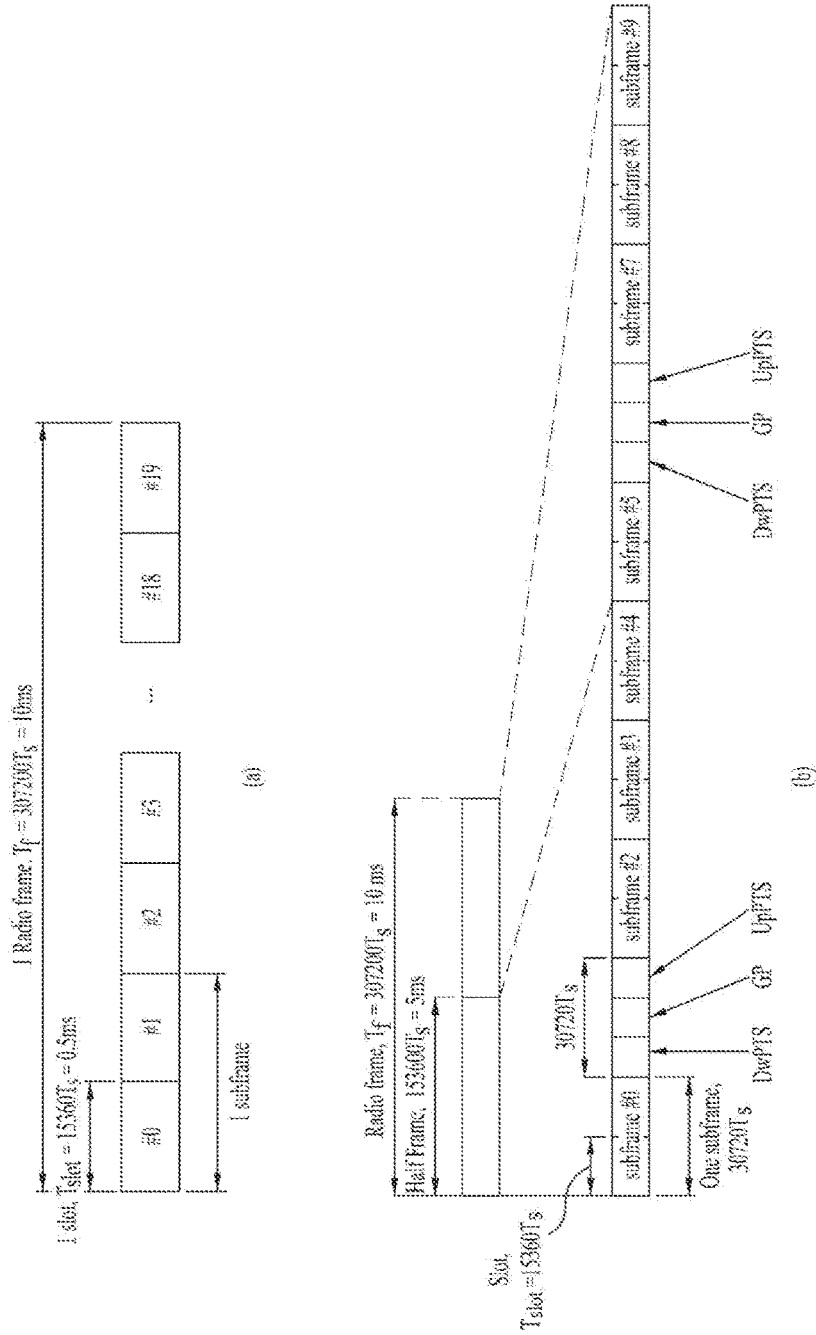
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain. Unless specifically mentioned, "OFDM symbol" or "SC-FDMA" symbol may be referred to simply as "symbol" (hereinafter referred to as 'sym').

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

[Table 1] lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents a DL subframe, U represents a UL subframe, and S represents a special subframe.

In [Table 1], D represents a DL subframe, U represents a UL subframe, and S represents a special subframe.

Figure 3:
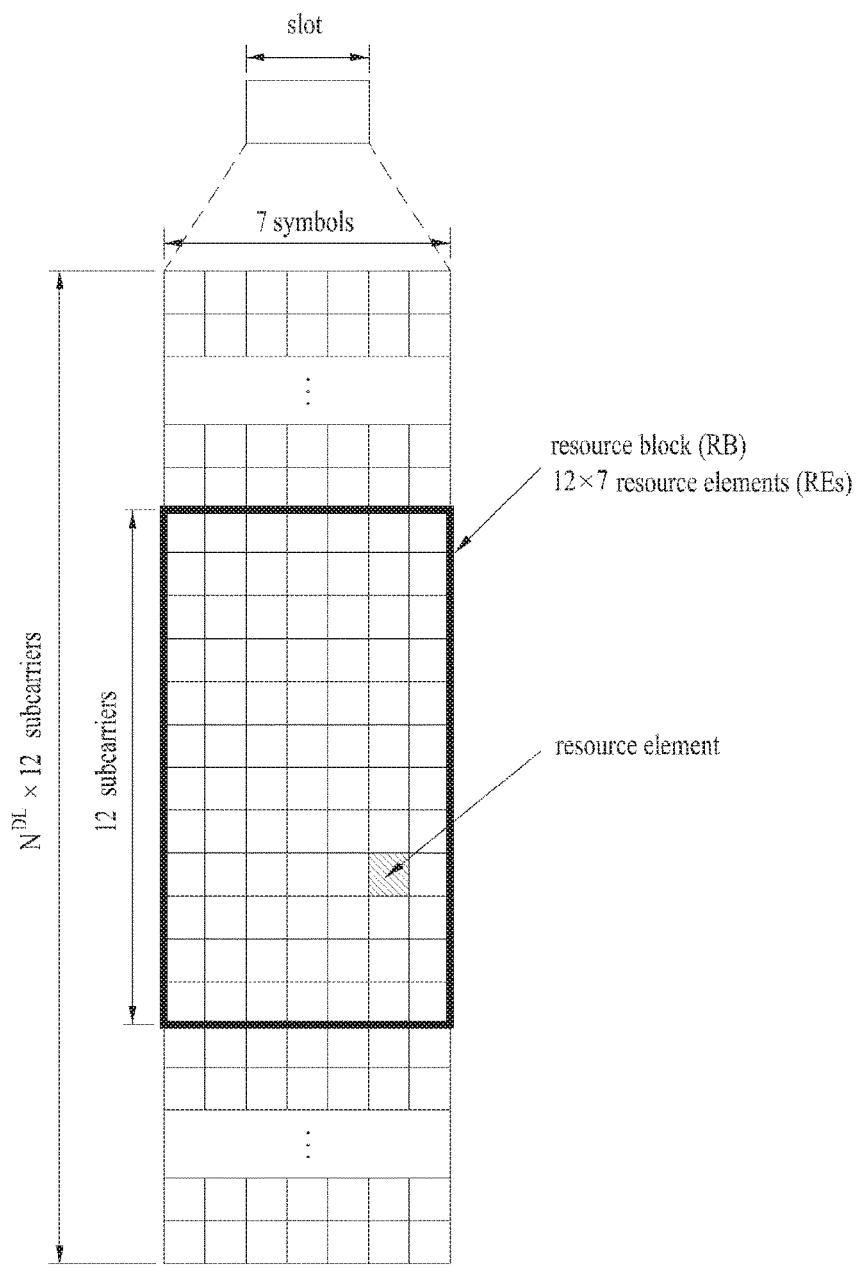
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
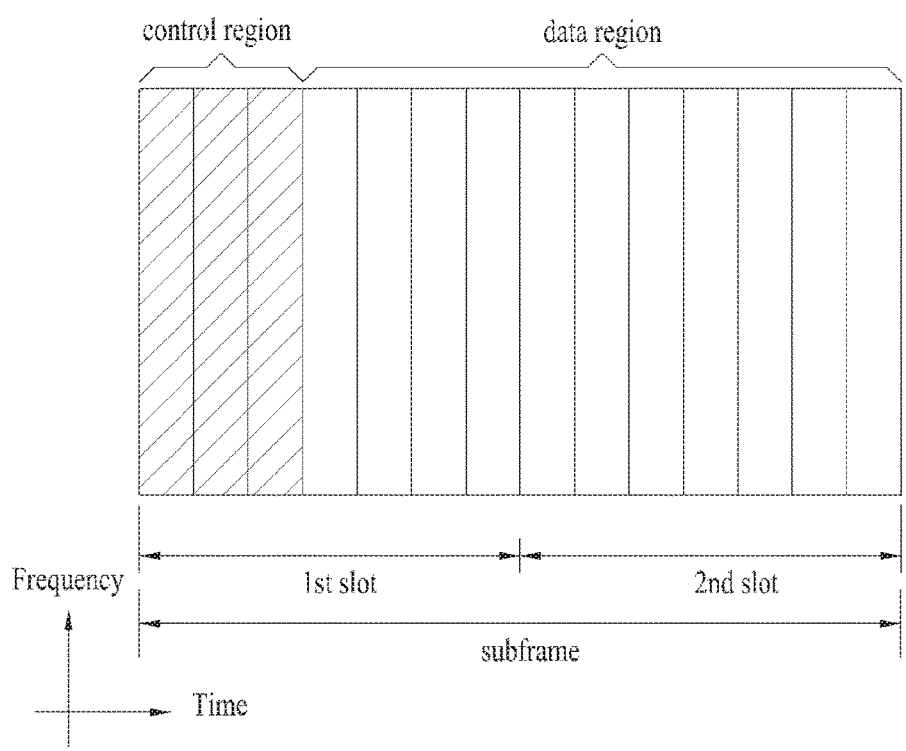
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc. The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel A CCE includes a plurality of REGs. The format of a PDCCH and the number of available bits for the PDCCH are determined according to the number of CCEs.

[Table 2] lists the number of CCEs, the number of REGs, and the number of PDCCH bits for each PDCCH format.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI) according to the owner or usage of a PDCCH. In other words, the PDCCH is CRC-scrambled with the ID (e.g., the RNTI).

[Table 3] lists exemplary IDs by which a PDCCH is masked.

TABLE 3

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE(-A) standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

[Table 4] lists CSS sizes and USS sizes.

TABLE 4

| PDCCH format | Number of CCEs (n) | Number of PDCCH candidates in CSS | Number of PDCCH candidates in USS |
|---|---|---|---|
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM) configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs
TM 1: transmission from a single eNB antenna port
TM 2: transmit diversity

TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI Formats
format 0: resource grant for PUSCH transmission
format 1: resource allocation for single-codeword PDSCH transmission (TMs 1, 2 and 7)
format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 5:
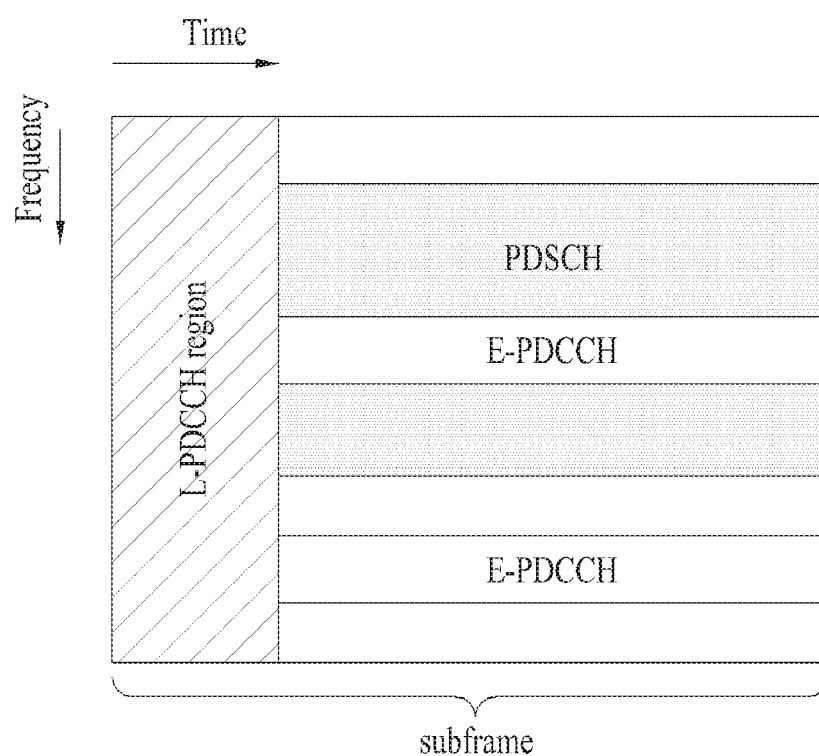
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS.

A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
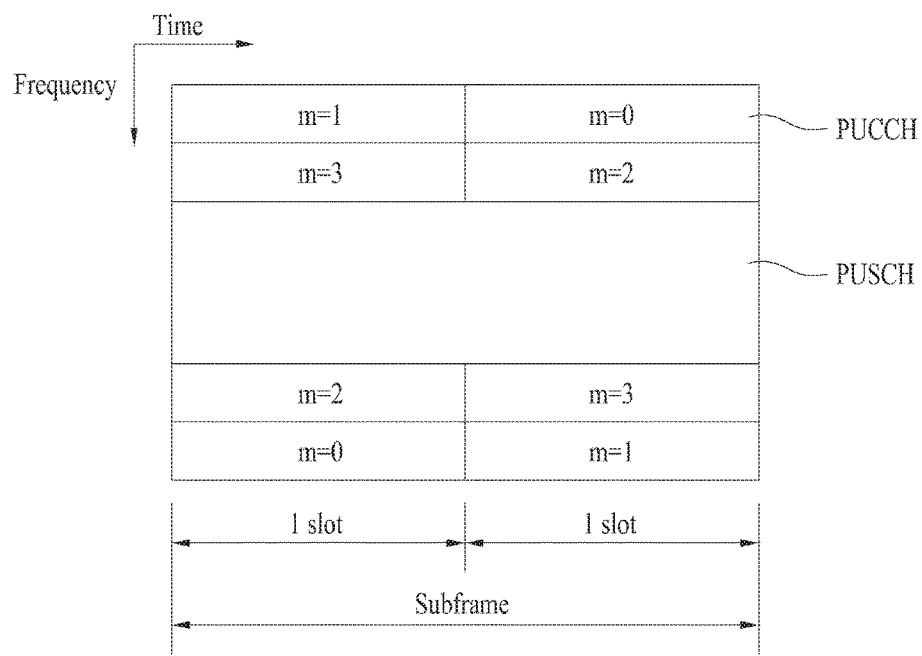
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.
Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

[Table 5] illustrates a mapping relationship between PUCCH formats and UCI in the LTE system.

TABLE 5

| PUCCH format | (Uplink Control Information) UCI |
|---|---|
| format 1 | SR(Scheduling Request) (non-modulated waveform) |
| format 1a | bit HARQ ACK/NACK (SR present/absent) |
| format 1b | bit HARQ ACK/NACK (SR present/absent) |
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

Figure 7:
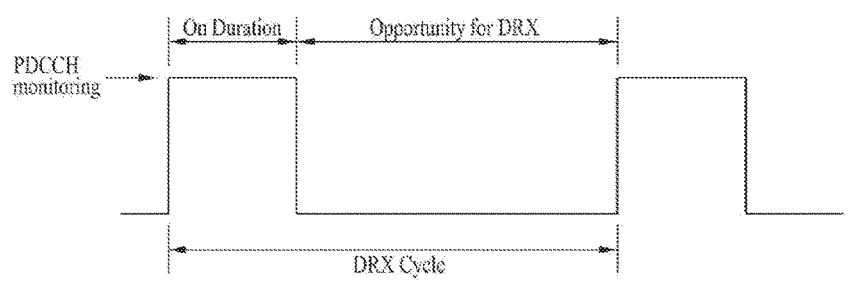
FIG. 7 is a conceptual diagram illustrating exemplary Discontinuous Reception (DRX).

FIG. 7 is a conceptual diagram illustrating Discontinuous Reception (DRX). User equipment (UE) may perform DRX to reduce power consumption. DRX may control PDCCH monitoring activation of the UE. Referring to FIG. 7, the DRX period may include one period denoted by "On duration" and the other period denoted by "Opportunity for DRX". In more detail, the UE may monitor PDCCH for the "On duration" period, and may not perform PDCCH monitoring during the "Opportunity for DRX" period. The PDCCH monitoring may include monitoring C-RNTI, TPC-PUCCH-RNTI, and TPC-PUSCH-RNT of the UE, and may further include monitoring SPS (Semi-Persistent Scheduling) C-RNTI of the UE (when configuration is achieved). If the UE is in the RRC (Radio Resource Control)_CONNECTED state and DRX is configured, the UE may perform discontinuous monitoring of PDCCH according to the DRX operation. Otherwise, the UE may perform continuous monitoring of the PDCCH. "onDurationTimer" and DRX cycle may be configured through RRC signaling (i.e., higher layer signaling). "onDurationTimer" may denote the number of successive PDCCH-subframes starting from the start time of the DRX cycle. In FDD, the PDCCH subframe may denote all subframes. In TDD, the PDCCH subframe may denote a subframe including both a downlink (DL) subframe and a DwPTS.

Figure 8:
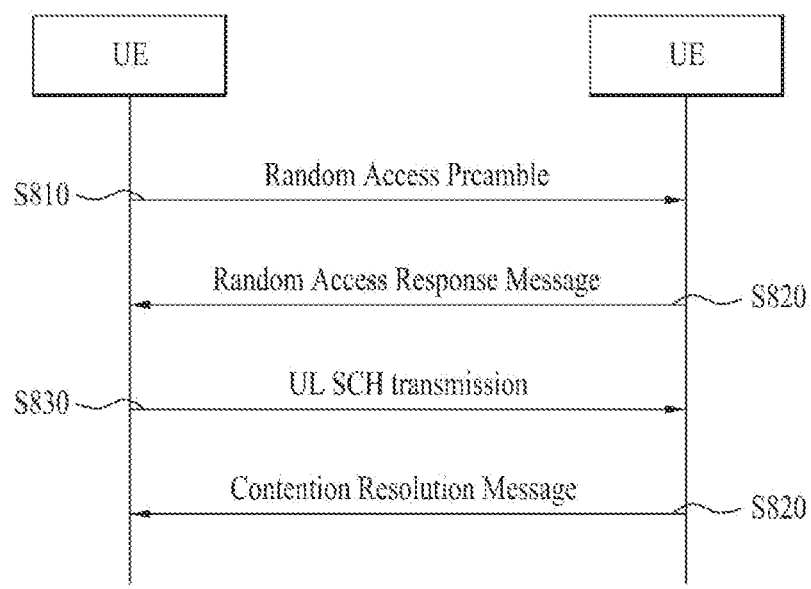
FIG. 8 is a conceptual diagram illustrating a Random Access Procedure (RAP).

FIG. 8 illustrates a random access procedure. The random access procedure is used to transmit UL short data. For example, upon occurrence of initial access in Radio Resource Control (RRC)_IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 8, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

Figure 9:
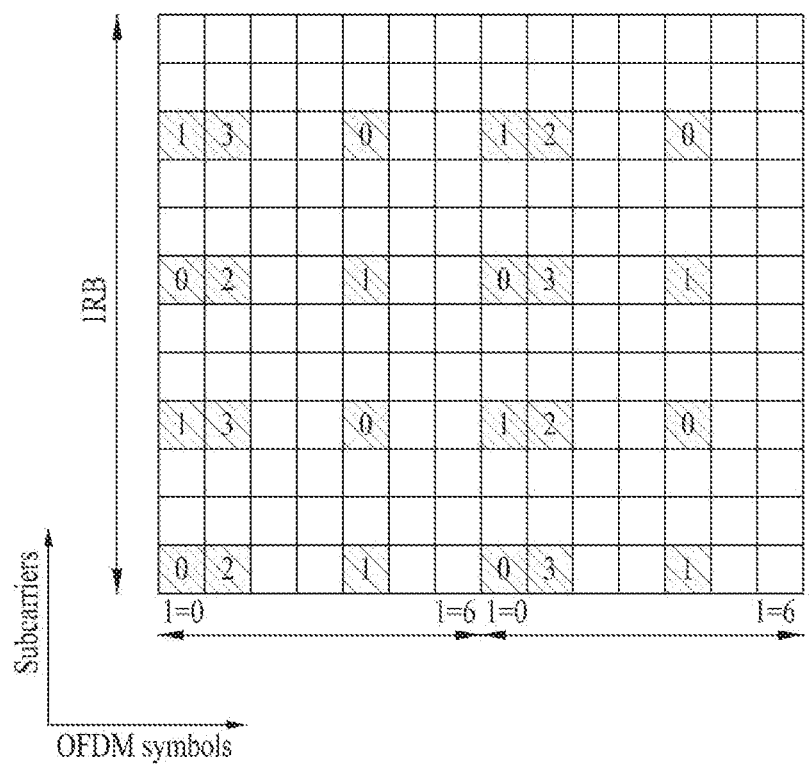
FIG. 9 is a conceptual diagram illustrating Cell-specific Reference Signal (CRS).

FIG. 9 is a conceptual diagram illustrating a CRS. Referring to FIG. 9, CRS may be transmitted through the antenna ports 0~3. One antenna (P=0), two antennas (P=0, 1), or four antennas (P=0, 1, 2, 3) may be supported according to base stations (BSs). FIG. 9 illustrates the CRS structure used when a maximum of 4 antennas is supported. In the LTE system, CRS is used not only for demodulation but also for measurement. CRS may be transmitted throughout the entire band in all DL subframes supporting PDSCH transmission, and may be transmitted through all antenna ports configured in the BS. In the meantime, CRS is transmitted through the entire band for each subframe, resulting in high RS overhead.

MTC CE (Machine Type Communication Coverage Enhancement)

At least a part of the aforementioned items of the LTE system can be applied to a wireless communication system supporting MTC, a base station and/or an MTC UE described in the following. As a next system of the LTE-A, it may consider configuring a low-cost/low-specification terminal mainly performing data communication such as reading a meter, measuring a water level, utilizing a surveillance camera, reporting inventory of a vending machine, etc. For clarity, the terminal is commonly referred to as an MTC (Machine Type Communication) terminal. In case of the MTC UE, transmitted data amount is less and uplink/downlink data transmission and reception occurs from time to time. Hence, it may be efficient to lower a price of a terminal and reduce battery consumption in accordance with the data transfer rate. An MTC UE has characteristics of low mobility and channel environment that is almost fixed. Discussion on various CE (coverage enhancement) schemes is in progress in current LTE-A to enable an MTC UE to have wider uplink/downlink coverage.

Exemplary methods for enhancing coverage of an MTC UE are described in the following.

(i) TTI bundling, HARQ retransmission, repetitive transmission, code spreading, RLC segmentation, low rate coding, low modulation order and new decoding scheme: Energy of a signal can be accumulated via a scheme of extending signal transmission time to enhance coverage. TTI bundling in a data channel and HARQ retransmission can be used to enhance coverage. Currently, UL HARQ retransmission can be performed maximum 28 times and TTI bundling supports maximum 4 contiguous subframes. A method of performing TTI bundling via a greater TTI bundle size and a method of increasing a maximum HARQ retransmission count can be considered to improve performance. Besides the TTI bundling and the HARQ retransmission methods, a repetitive transmission scheme can also be used. Whenever the repetitive transmission is performed, a redundancy version can be identically or differently configured. And, it may consider performing code spreading in time domain to enhance coverage. For the coverage enhancement, an MTC traffic packet can be segmented into RLC segments. For the coverage enhancement, it may use a very low coding rate, a low modulation order (e.g., BPSK), or a shorter CRC length. It may be able to use a new decoding scheme (e.g., reducing a search space to be correlated or decoded) in consideration of a property of a specific channel (e.g., channel periodicity, a rate of changing a parameter, a channel structure, content restriction, etc.) and required performance (e.g., delay tolerance) to enhance the coverage.

(ii) Power boosting, PSD (Power Spectral Density) boosting: In order to perform DL transmission to an MTC UE, a base station can boost DL transmit power. Or, a base station or an MTC UE reduces a size of a bandwidth and concentrates a given power level to the reduced bandwidth to enhance coverage (i.e., PSD boosting). The power boosting or the PSD boosting can be used in consideration of each channel or a signal.

(iii) Relaxed requirement: In case of a partial channel, performance requirement can be relaxed in consideration of a characteristic of an MTC UE (e.g., allow greater delay). In case of a synchronization signal, an MTC UE can accumulate energy of the signal in a manner of combining periodically transmitted PSS or SSS with each other many times. The scheme mentioned above may increase time taken for obtaining synchronization. Or, in case of PRACH, a relaxed PRACH detection threshold rate and a higher false alarm rate can be used in a base station.

(iv) New design of a channel or a signal: It may consider newly designing a channel or a signal to enhance coverage.

(v) Using small cell: In order to enhance coverage of an MTC UE and/or a non-MTC UE, a small cell (e.g., pico, femto, RRH, relay, repeater, etc.) can be used. If a small cell is used, it may reduce a path loss between a UE and a cell closest to the UE. Downlink and uplink can be decoupled with respect to an MTC UE. In case of uplink, a best serving cell can be selected based on the least coupling loss. In case of downlink, since imbalance of transmit power is big between a macro cell and an LPN (low power node) (e.g., antenna gain), a best serving cell may correspond to a cell of which power of a reception signal is maximized. In order to perform the UL/DL decoupling operation, a macro serving cell and potential LPNs exchange information on a channel configuration (e.g., RACH, PUSCH, SRS) with each other and may be then able to identify an appropriate LPN. For decoupled UL/DL, it may be necessary a different RACH configuration.

(vi) Other schemes: Directional antennas and external antennas can be used for enhancing coverage for an MTC UE.

Meanwhile, maximum 20 MHz bandwidth per carrier is supported to a non-MTC UE. A size of a maximum bandwidth supported to reduce cost of an MTC UE can be configured by a size smaller than 20 MHz (e.g., 1.4 MHz, 3 MHz, or 5 MHz). Reduction of a maximum bandwidth can be applied to up/downlink, an RF/baseband device, and a data/control channel. In the following, a method of reducing a size of a bandwidth is explained.

In case of downlink, it may consider an option of reducing a bandwidth for both an RF and a baseband (option DL-1), an option of reducing a bandwidth of a baseband for both a data channel and a control channel (option DL-2), an option of reducing a bandwidth of a data channel only while permitting the entire bandwidth of a carrier to a control channel, and the like, by which the present invention may be non-limited.

In case of uplink, it may consider an option of reducing a bandwidth for both an RF and a baseband (option UL-1), an option of not reducing a bandwidth (option UL-2) and the like, by which the present invention may be non-limited.

In the aforementioned options, a minimum size of a reduced bandwidth corresponds to 1.4 MHz and the reduced bandwidth has a fixed position in a frequency axis or may be located at the center of a carrier bandwidth, by which the present invention may be non-limited. And, the aforementioned uplink options and the downlink options can be combined with each other. Moreover, for an MTC UE, a position of the reduced bandwidth on the frequency axis can be semi-statically changed or changed according to an operation or a predetermined pattern.

Based on the aforementioned contents, a low cost & enhanced coverage MTC UE for LTE and a low complexity MTC UE are described in the following.

Figure 10:
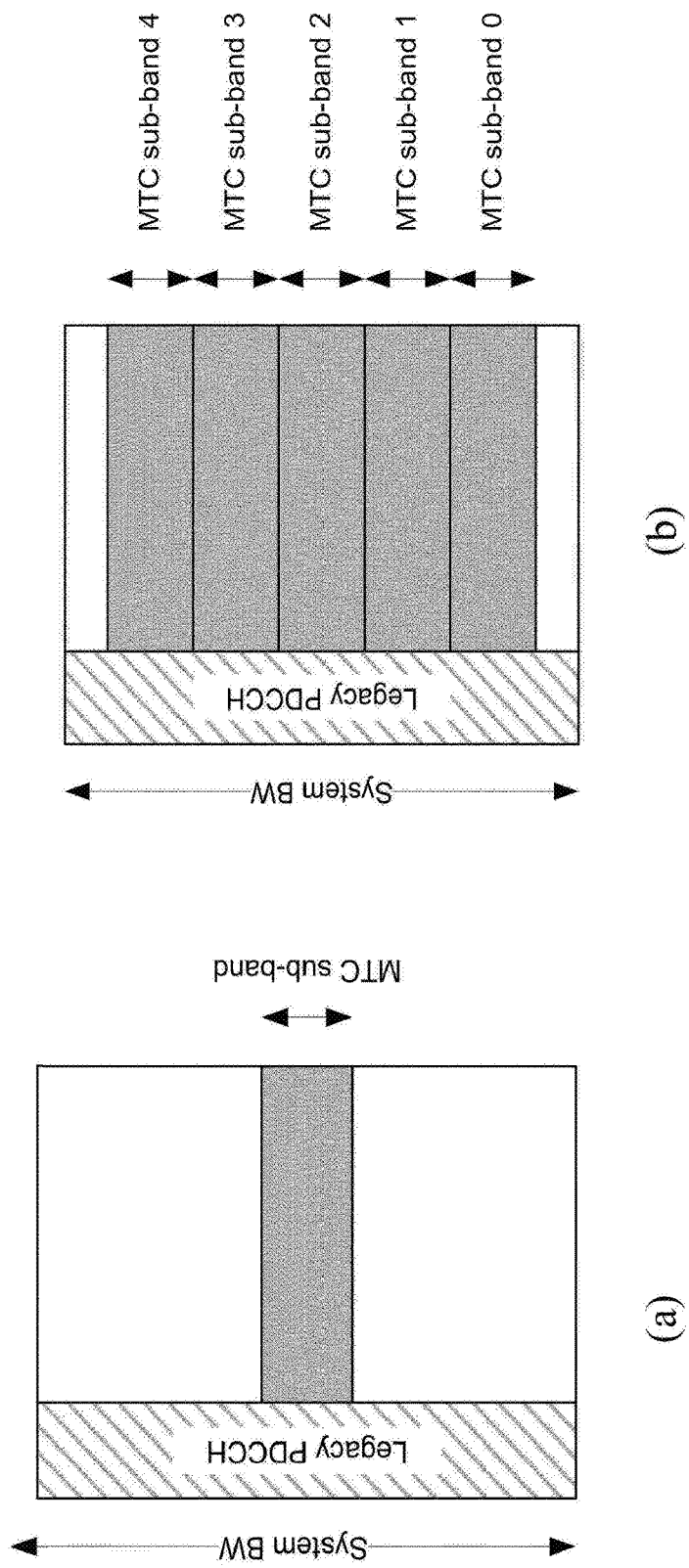
FIG. 10 illustrates an example of an MTC subband according to one embodiment of the present invention.

FIG. 10 illustrates an example of a subband for an MTC UE according to one embodiment of the present invention.

As mentioned in the foregoing description, unlike an operation system bandwidth of a practical cell, for example, an uplink/downlink operation of an MTC UE can be performed on a bandwidth reduced to 1.4 MHz. In the following, a reduced band can be referred to as a narrow band or a subband.

Referring to FIG. 10 (a), a subband on which an MTC UE operates can be located at the center (e.g., center 6 PRBs) of a frequency band of a cell. On the contrary, as shown in FIG. 10 (b), a plurality of subbands on which MTC UE operates can be configured in a subframe. A plurality of the subbands can be used for multiplexing between MTC UEs. For example, MTC UEs can be configured to be assigned by subbands different from each other. Although a plurality of subbands are assigned to MTC UEs, the MTC UEs can be configured to use subbands different from each other.

Subbands on which an MTC UE operates can be set to a data region instead of a legacy PDCCH region. For example, an MTC UE and a base station can transceive uplink/downlink signals (e.g., MIB, SIB-x, MTC PDCCH, MTC PDSCH, MTC PUCCH, MTC PUSCH) via the data region, by which the present invention may be non-limited. Meanwhile, UL subband configuration for transmitting an uplink signal transmitted by an MTC UE and DL subband configuration for receiving a downlink signal may be different from each other. In the following, a method for an MTC UE to configure a subband is explained in more detail.

1. Subband Configuration of MTC UE

If an MTC UE transmits and receives a signal via a part of a system bandwidth only of a base station, it is able to implement the MTC UE with a lower cost. For example, when a system bandwidth of a specific cell corresponds to 50 RBs, if an MTC UE transmits and receives a signal via a subband of a unit of 6 RBs, complexity of the MTC UE is reduced and the MTC UE can be implemented with a lower cost.

In the following, for clarity, assume that a size of a single subband corresponds to 6 RBs. Yet, it may be able to support a subband of a different size as well. When a DL bandwidth (or UL bandwidth) corresponds to $N_{BR}$ (e.g., $N_{BR}$ indicates the number of RBs included in a bandwidth), the DL bandwidth (or UL bandwidth) can include $$\left\lfloor \frac{N_{RB}}{6} \right\rfloor$$

number of subbands in total. '$\lfloor \ \rfloor$' indicates a floor function. Hence, when a bandwidth size of a specific cell corresponds to $N_{BR}$, the maximum integer number of subbands not exceeding '$N_{BR}/6$' exists in the bandwidth. In the following, for clarity, a bandwidth of a cell can be referred to as a system bandwidth. A bandwidth may mean a DL bandwidth or a UL bandwidth. The DL bandwidth and the UL bandwidth can be identically or differently configured according to system environment.

Meanwhile, if $N_{RB}$ is not a multiple of 6, the rest of RBs not included in any subband may exist with a number less than 6. For example, the rest of RBs not included in any subband may exist as many as '$N_{RB}$ mod 6'. The rest of RBs less than 6 RBs may not be used for transmitting and receiving a signal of an MTC UE (e.g., frequency hopping described later). For example, when a bandwidth $N_{RB}$ corresponds to 50, the bandwidth includes 8 subbands each of which has a size of 6 RBs and the remaining 2 RBs. In this case, 8 subbands each of which has a size of 6 RBs are used for frequency hopping of an MTC UE only. The remaining 2 RBs may not be used for frequency hopping.

A method of arranging MTC subbands and the remaining RB according to embodiment of the present invention is explained in the following with reference to FIG. 11.

Figure 11:
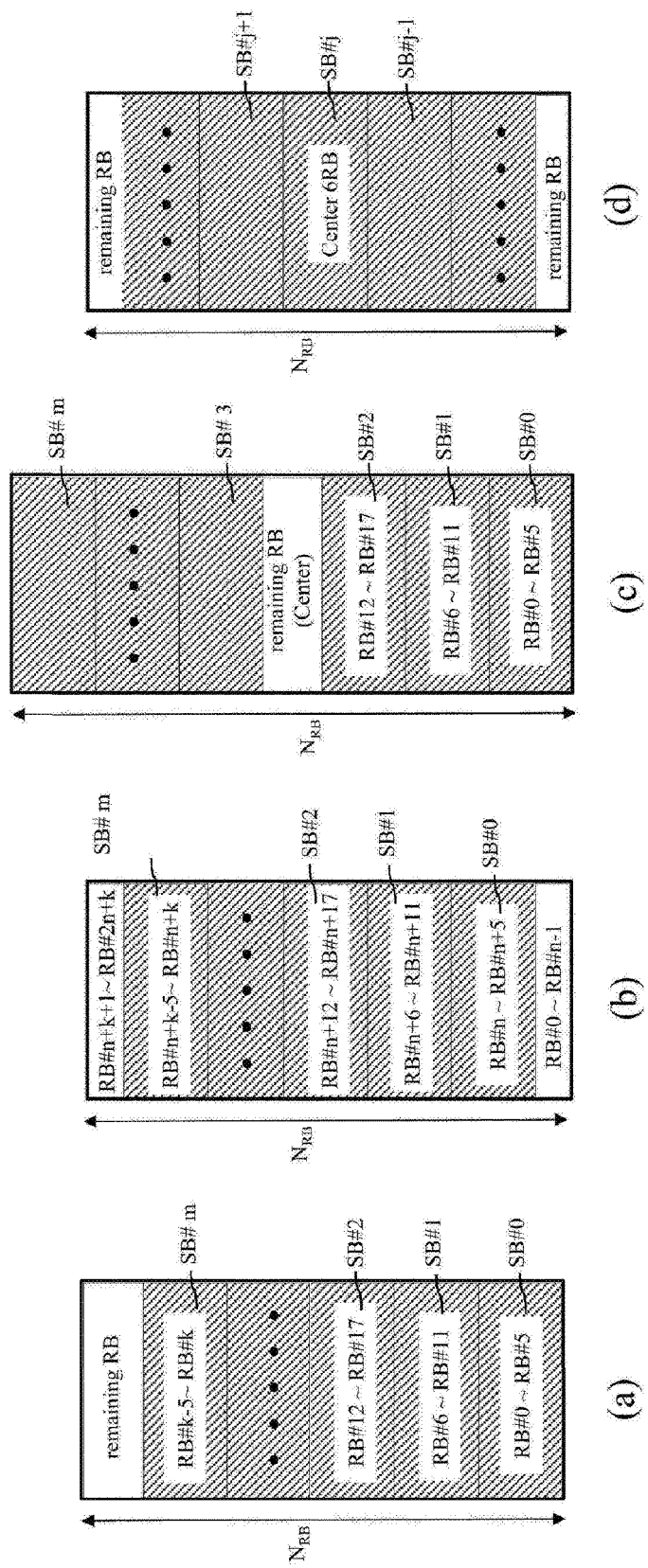
FIG. 11 illustrates an example of an MTC subband according to a different embodiment of the present invention.

FIG. 11 (a) shows a method of reusing a definition of a PRB according to a bandwidth of a corresponding cell. Referring to FIG. 11 (a), one subband is configured by a unit of 6 contiguous PRBs from a lowest PRB of a system bandwidth. For example, if a lowest PRB index of a system bandwidth corresponds to 0, a PRB #0 to a PRB #5 are configured as a subband #0 (according to a different embodiment of the present invention, one subband can also be configured by a unit of 6 contiguous PRBs from a highest PRB). According to embodiment (a), a boundary of center 6 RBs may not be matched with a boundary of subband 6 RBs depending on a system bandwidth.

FIG. 11 (b) shows a method of uniformly arranging the remaining RBs not used for frequency hopping to both ends of a system bandwidth. For example, if a system bandwidth corresponds to 50 RBs and the remaining RBs correspond to 2 RBs, each of the remaining RBs can be respectively allocated to both ends of the system bandwidth. In other word, if there are 2n numbers of remaining RBs, n number of RBs are allocated to the lowest part of the system bandwidth and another n number of RBs can be allocated to the top part of the system bandwidth.

FIG. 11 (c) shows an example for a method of arranging an RB not used for frequency hopping between groups of subbands (e.g., between a group of contiguous subbands in a lower part and a group of contiguous subbands in a higher part). For clarity, the RB not used for frequency hopping in a manner of being allocated between groups of subbands is referred to as an intervening RB. Subbands can be divided into 2 subband groups by the intervening BR. A position of the intervening RB can be determined according to a size of a system bandwidth. For example, an intervening RB not used for frequency hopping can be allocated to the center depending on a size of a system bandwidth. Specifically, when a size of a system bandwidth corresponds to 50 RBs, the remaining 2 RBs not used for frequency hopping can be allocated to the center of the system bandwidth. And, when a size of a system bandwidth corresponds to 49 RBs, the remaining 1 RB not used for frequency hopping can be allocated to the center of the system bandwidth. According to the present embodiment, if the number of low subbands (e.g., 4) located at a frequency band lower than a center RB of a system bandwidth is identical to the number of high subbands (e.g., 4) located at a frequency band higher than the center RB of the system bandwidth, the center RB is configured as an intervening RB. However, if the number of high subbands and the number of low subbands are different from each other, an intervening RB can be configured not by the center RB but by another 1 RB. Hence, subbands used for frequency hopping can be efficiently separated from each other in frequency domain.

FIG. 11 (d) shows a method of matching center 6RBs with a boundary of a subband used for frequency hopping. If frequency hopping for transmission of MTC system information (e.g., SIB) or MTC paging is deactivated, the transmission of the MTC system information or the MTC paging can be performed in the center 6 RBs. In this case, according to FIG. 11 (d), it is able to minimize an impact due to an overlap between a resource of MTC PDSCH in which frequency hopping is performed and a resource of the MTC system information (or MTC paging).

FIG. 12 illustrates an MTC subband configuration method according to a different embodiment of the present invention. The embodiment of FIG. 12 can be performed on the basis of FIGS. 11 (b) and (c).

FIG. 12 (a) shows a case that the number of RBs not belonging to an MTC subband corresponds to an even number (e.g., 2n RBs) in a system bandwidth and FIG. 12 (b) shows a case that the number of RBs not belonging to an MTC subband corresponds to an odd number (e.g., 2n+1 RBs) in a system bandwidth. Referring to FIG. 12 (a), n numbers of RBs among the 2n numbers of remaining RBs are allocated to the lowest part of the system bandwidth and another n numbers of RBs are allocated to the highest part of the system bandwidth. Referring to FIG. 12 (b), one RB among the 2n+1 number of remaining RBs is allocated between low subbands (SB#0~SB#k) and high subbands (SB#k+1~SB#m) (e.g., intervening RB) and 2n number of RBs are allocated to the highest band and the lowest band of the system bandwidth in a manner of being uniformly divided. When the number of subbands corresponds to M in total, low subbands correspond to subbands of which a subband index is less than M/2 and high subbands correspond to subbands of which a subband index is equal to or greater than M/2. Hence, if the number of low subbands and the number of high subbands are identical to each other, a center RB can be configured as an intervening RB.

A position of a subband identified by a UE or a base station may vary depending on a subband configuration scheme among the aforementioned various subband configuration schemes. For example, when a scheme shown in FIG. 11 (b) is used, if a base station allocates SB#0 to an MTC UE, the MTC UE identifies RB#n to RB#n+5 as the SB#0. On the contrary, if a scheme shown in FIG. 11 (c) is used, the MTC UE identifies RB#0 to RB#5 as the SB#0.

For example, when an MTC UE (or a base station) identifies a position of 6 RBs specified by an SB index, it is necessary for the MTC UE to consider a position to which the remaining RB not belonging to a subband is allocated.

2. Frequency Hopping of MTC UE

Meanwhile, an MTC UE can be installed in a poor propagation environment (e.g., basement, warehouse, etc.) and the MTC UE has relatively less mobility. In order to overcome the poor propagation environment, it may consider a method of repeatedly transmitting a signal. Yet, if a channel state of a subband used by the MTC UE among a system bandwidth is poor, there exists a problem of rapidly consuming a battery of the MTC UE repeatedly transmitting and receiving a signal for a long time in a poor subband as well as a problem of deteriorating a signal. In order to solve the problems, a subband on which a signal is repeatedly transmitted can be changed according to time (e.g., frequency hopping or frequency hopping subband). If a subband is changed, a diversity gain occurs and the count of repeatedly transmitting a signal can be reduced. Hence, if frequency hopping is performed, it may be able to improve signal transmission and reception performance of the MTC UE and reduce battery consumption of the MTC UE. Hence, a base station can set information on whether or not frequency hopping is performed and information on a frequency hopping subband to the MTC UE. When frequency hopping is performed on an MTC signal, a frequency on which the signal is transmitted is not hopping but the subband itself is transmitted in a manner of being changed (e.g., hopping) in an identical subband (or a band). For example, when MTC PDCCH includes a resource allocation field indicating an RB to which MTC PDSCH is assigned, a subband itself to which the resource allocation field is applied can be hopped.

Since a low-cost MTC UE uses a partial band only of a base station, the base station can configure the number of subbands capable of being used by the MTC UE to multiplex a legacy UE and the MTC UE. For example, the base station can allocate 2 subbands each of which has a size of 6 RBs to the MTC UE and may be able to allocate the remaining 38 RBs to the legacy UE among a system bandwidth of 50 RBs.

In order to perform frequency hopping on an MTC UE, it is necessary to have at least two or more frequency hopping subbands. Hence, if a system bandwidth is equal to or less than a threshold value, it may be difficult to support frequency hopping. For example, if a system bandwidth is equal to or less than 15 RBs (or 25 RBs), it may be difficult to support frequency hopping. If frequency hopping is set to an MTC UE, a base station can configure 2 or 4 frequency hopping subbands. The base station can fix the number of frequency hopping subbands as 2 in consideration of complexity such as CSI feedback and the like. In this case, the MTC UE can transmit and receive a signal through the 2 frequency hopping subbands. According to one embodiment of the present invention, the number of frequency hopping subbands supported in DL can be configured by 2 or 4. The number of frequency hopping subbands supported in UL can be configured by 2.

A set of frequency hopping subbands may change according to time. For example, it is able to configure an MTC UE to receive a signal in a subframe #n and a subframe #(n+1) in a manner of performing frequency hopping on a subband #1 and a subband #2 and receive a signal in a subframe #(n+2) and a subframe #(n+3) in a manner of performing frequency hopping on a subband #3 and a subband #4.

Meanwhile, a frequency hopping scheme, a frequency hopping pattern, a frequency hopping subband configuration, the count of repetitive transmission, and the like can be differently configured depending on a signal transceived between an MTC UE and a base station. In the following, a method for an MTC UE to repeatedly receive a DL signal while performing frequency hopping is explained in more detail according to a type of a DL signal.

2-1. MTC System Information

According to one embodiment of the present invention, at least a part of MTC system information can be repeatedly transmitted while performing frequency hopping on a subband. Information on whether or not the MTC system information performs frequency hopping can be activated or deactivated by a base station. If the frequency hopping is activated, information on frequency hopping subbands should be provided to an MTC UE.

The MTC system information can include MTC MIB (master information block), MTC SIB 1 (system information block type 1) and MTC SIB-x (where x>1). The MTC MIB, the MTC SIB 1 and the MTC SIB-x are transmitted by a base station according to each periodicity. Scheduling information on the MTC MIB 1 is transmitted via the MTC SIB. And, scheduling information on the MTC-SIB-x is transmitted via the MTC SIB 1. Hence, an MTC UE preferentially receives the MTC MIB and receives the MTC SIB 1 based on the MTC MIB. Subsequently, the MTC UE receives the MTC SIB-x based on the MTC SIB 1.

The MTC MIB is mapped to MTC PBCH in a physical layer and the MTC SIB 1 and the MTC SIB-x are mapped to MTC PDSCH in a physical layer (e.g., RRC signaling). Since the MTC PDSCH including the system information has a cell-common characteristic, the MTC PDSCH is distinguished from unicast PDSCH for transmitting data of an individual MTC UE. Hence, unlike the unicast PDSCH, a different frequency hopping pattern or a different subband can be set to the MTC PDSCH to which the system information is mapped.

Whether or not frequency hopping is performed on the MTC SIB (e.g., MTC SIB-1, MTC SIB-x) can be configured or signaled to an MTC UE by a base station. For example, the base station can configure frequency hopping to be activated for both the MTC SIB-1 and the MTC SIB-x. On the contrary, the base station can configure frequency hopping to be activated for either the MTC SIB-1 or the MTC SIB-x (e.g., MTC SIB-x) only.

If frequency hopping is performed on the MTC-SIB-1, information (e.g., information on a frequency hopping pattern of the MTC SIB-1, information on a repetition pattern of the MTC SIB-1) on the frequency hopping of the MTC SIB-1 can be indicated by MIB.

According to a different embodiment, information on a frequency hopping pattern of the MTC SIB 1 can be determined via a cell ID and/or SFN (system frame number). Meanwhile, it may be able to configure frequency hopping on the MTC SIB 1 to be performed all the time and configure frequency hopping on the MTC SIB-x to be activated or deactivated by the MTC SIB 1.

And, if frequency hopping on the MTC SIB-x is configured, information on the frequency hopping performed on the MTC SIB-x can be indicated by the MTC SIB 1. For example, the MTC SIB 1 can include information for indicating whether or not frequency hopping for the SIB-x (e.g., system information message) is activated and information (e.g., subband index) for indicating a subband on which SIB-x is transmitted. And, the MTC SIB 1 can include information for specifying a subframe in which repetitive transmission of the SIB-x is performed.

Meanwhile, a frequency hopping pattern can also be defined by a function of SFN (System Frame Number). For example, it may be able to determine a subband on which the SIB-1 or the SIB-x is transmitted in consideration of the SFN.

A base station can signal a time/frequency resource (e.g., subframe set, subband) on which the MTC SIB (e.g., MTC SIB-1, MTC SIB-x) is transmitted to a UE. In this case, if a resource for transmitting unicast MTC PDSCH and a resource for transmitting MTC SIB are collided with each other in a subframe, an MTC UE assumes that the MTC PDSCH is not transmitted in the subframe and may be able to receive the MTC SIB only in the subframe.

2-2. MTC Random Access Message

A random access message for an MTC UE, (e.g., an MTC RAR (random access response)) is transmitted by a base station during a time of a prescribed period after a random access preamble is transmitted by the MTC UE. In the following description, for clarity, assume that the random access message corresponds to the MTC RAR, by which the present invention may be non-limited.

The base station can configure frequency hopping of the MTC RAR to be activated or deactivated to the MTC UE.

A set of frequency hopping subbands configured for the MTC RAR may be identical to a set of frequency hopping subbands configured for MTC PDSCH. If the MTC RAR is transmitted on a frequency hopping subband identical to a frequency hopping subband of unicast MTC PDSCH, collision may occur between the MTC RAR and the unicast MTC PDSCH. For example, if MTC RAR of an MTC UE 1 and MTC PDSCH of an MTC UE 2 are collided with each other, a base station can transmit either the MTC RAR of the MTC UE 1 or the MTC PDSCH of the MTC UE 2 only. If the base station transmits one of the MTC RAR and the MTC PDSCH only and drops another one, since it is difficult for an MTC UE expecting to receive a dropped signal to know whether or not the MTC RAR or the MTC PDSCH is transmitted or dropped, performance deterioration occurs in receiving the MTC RAR or the MTC PDSCH.

Hence, the base station can configure a subband for frequency hopping of the MTC RAR and a frequency hopping subband for frequency hopping of the unicast MTC PDSCH to be different from each other. For example, the base station can differently configure a set itself of frequency hopping subbands for each of the MTC RAR and the MTC PDSCH. Or, although an identical set of frequency hopping subbands is configured, the base station can differently configure a frequency hopping pattern. It may be able to configure MTC PDSCH (i.e., RAR), which is scheduled by MTC PDCCH masked (scrambled) with MTC RA-RNTI, and MTC PDSCH (i.e., unicast data except RAR), which is scheduled by MTC PDCCH masked with MTC C-RNTI, to have a different frequency hopping pattern.

A base station can signal a time/frequency resource (e.g., subframe set, subband) in which MTC RAR is transmitted to a UE. In this case, if a resource for transmitting unicast MTC PDSCH and a resource for transmitting MTC RAR are collided with each other in a subframe, an MTC UE assumes that the unicast MTC PDSCH is not transmitted in the subframe and may be able to receive the MTC RAR only in the subframe.

2-3. MTC PDCCH/PDSCH

MTC PDSCH can be decoded by DCI included in MTC PDCCH. The MTC PDCCH schedules the MTC PDSCH. It is able to determine RNTI for scrambling the MTC PDCCH depending on information transmitted on the MTC PDSCH. The information transmitted on the MTC PDSCH may correspond to system information, RAR, or general unicast data (e.g., SI-RNTI, RA-RNTI, or C-RNTI).

The MTC PDCCH and/or the MTC PDCCH can be repeatedly transmitted based on frequency hopping. A base station can set activation/deactivation of the frequency hopping of the MTC PDCCH and/or the MTC PDSCH to an MTC UE (e.g., RRC signaling). Meanwhile, the MTC PDCCH can include information for indicating whether or not frequency hopping is performed on the MTC PDSCH. In this case, the frequency hopping of the MTC PDSCH can also be performed when the MTC PDCCH indicates the frequency hopping of the MTC PDSCH while the frequency hopping of the MTC PDSCH is activated by a higher layer.

MTC PDCCH and MTC PDSCH for a single MTC UE can be configured not to be transmitted in an identical subframe. For example, repetitive transmission of the MTC PDSCH can be performed after repetitive transmission of the MTC PDCCH is preferentially performed. Subframes in which the MTC PDCCH is transmitted can be ahead of subframes in which the MTC PDSCH is transmitted.

The MTC PDCCH and the MTC PDSCH can be received via frequency hopping subbands different from each other. In the following description, various embodiments for differently configuring a frequency hopping subband of the MTC PDCCH and a frequency hopping subband of the MTC PDSCH scheduled by the MTC PDCCH are explained.

(i) Method for MTC PDCCH and MTC PDSCH to use an identical frequency hopping pattern: According to one embodiment of the present invention, a frequency hopping pattern (e.g., equation) itself for determining a frequency hopping subband can be identically configured for the MTC PDCCH and the MTC PDSCH whenever repetitive transmission is performed. Meanwhile, a base station can signal a subband at which repetitive transmission starts to an MTC UE (e.g., RRC signaling). For example, the base station can signal MTC PDCCH monitored by the MTC UE or an initial transmission subband of MTC PDSCH to the MTC UE. According to one embodiment of the present invention, the base station can indicate a subband on which first transmission is performed using broadcast information such as SIB and the like, SFN, and/or a UE ID, by which the present invention may be non-limited. Meanwhile, when the MTC PDCCH and the MTC PDSCH have an identical frequency hopping pattern (e.g., identical frequency hopping equation), in order to receive the MTC PDCCH and the MTC PDSCH via a different subband, it may configure a subband offset between the MTC PDCCH and the MTC PDSCH. For example, when 4 SBs in total including SB #1 to SB #4 are set to an MTC UE, the MTC PDCCH is transmitted via SB #1, SB #2, SB #3 and SB #4, and a subband offset corresponds to 1, the MTC PDSCH can be transmitted via the SB #2, the SB #4, the SB #3 and the SB #1. The base station can signal parameters necessary for determining a size of the subband offset and a frequency hopping pattern to the MTC UE.

(ii) Method for MTC PDCCH to indicate a subband of MTC PDSCH: MTC PDCCH can indicate information on a subband of MTC PDSCH on which frequency hopping is performed. For example, if the number of frequency hopping subband of the MTC PDSCH corresponds to 2, the MTC PDCCH indicates a subband at which transmission of the MTC PDSCH is initiated and receives the MTC PDSCH while hopping a subband at every Y number of subframes. A frequency hopping pattern of the MTC PDCCH can be indicated by higher layer signaling (e.g., SIB), SFN, UE ID and/or a combination thereof. According to a different MTC PDSCH configuration method, a subband of the MTC PDSCH can be configured on the basis of a subband of the MTC PDCCH. For example, transmission of the MTC PDSCH can be initiated at a subband on which repetitive transmission of the MTC PDCCH starts or a subband on which repetitive transmission of the MTC PDCCH is terminated.

(iii) Method of setting a different frequency hopping pattern to MTC PDCCH and MTC PDSCH: For example, if the number of frequency hopping subbands corresponds to 2, an MTC UE receives the MTC PDCCH at every Y1 subframe based on a first frequency hopping pattern and receives the MTC PDCCH at every Y2 subframe based on a second frequency hopping pattern. In this case, parameters for determining the frequency hopping patterns can be signaled to the MTC UE. For example, a frequency hopping pattern of the MTC PDCCH can be indicated by higher layer signaling (e.g., SIB), SFN, UE ID and/or a combination thereof.

3. Case of Deactivating Frequency Hopping for MTC UE

Frequency hopping of MTC SIB, MTC paging and the like are deactivated and it may be transmitted to center 6 RBs or a specific subband. In this case, a resource for MTC SIB, MTC paging and the like and a resource for unicast MTC PDSCH can be overlapped (e.g., collision) with each other. In this case, since an MTC UE is aware of information on time-frequency resource such as the MTC SIB, the MTC paging and the like, the MTC UE assumes that the unicast MTC PDSCH is not transmitted (dropped) and may be able to receive the MTC SIB/the MTC paging.

In the foregoing description, for clarity, embodiments have been explained centering on DL. Yet, the aforementioned embodiments can be applied to UL, for example, MTC PUCCH (e.g., ACK/NACK, CSI), PUSCH, or UL RS transmission as well.

Figure 13:
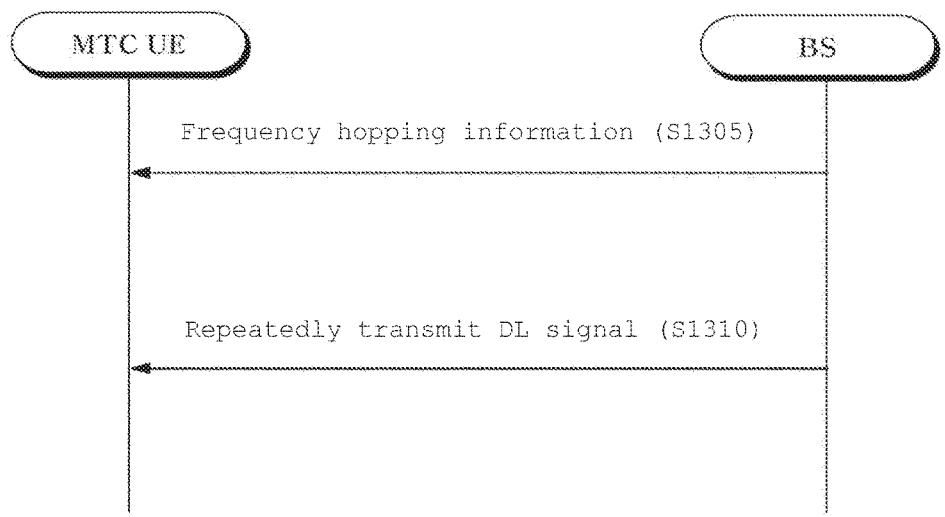
FIG. 13 is a flowchart for an example of a method of transmitting and receiving an MTC signal according to one embodiment of the present invention.

FIG. 13 is a flowchart for an example of a method of transmitting and receiving an MTC signal according to one embodiment of the present invention. Explanation on contents overlapped with what is mentioned earlier is omitted.

Referring to FIG. 13, an MTC UE receives frequency hopping information on a plurality of subbands included in a downlink band [S1305].

The MTC UE repeatedly receives a downlink signal via subbands different from each other based on the frequency hopping information [S1310].

A DL bandwidth can include $$\left\lfloor \frac{N_{RB}}{6} \right\rfloor$$

number of subbands each configured as 6 resource block (RB) size. '$N_{RB}$' corresponds to a size of a DL bandwidth and '$\lfloor \ \rfloor$' indicates a floor function. Among the DL bandwidth, if there exist the remaining band less than 6 RBs and not belonging to the $$\left\lfloor \frac{N_{RB}}{6} \right\rfloor$$

number of subbands, at least one of a lowest index RB, a highest index RB and an intervening RB between subband groups in the downlink band can be configured as the remaining band. If the remaining band includes even number RBs, the even number RBs can be allocated to the lowest band and the highest band of the DL bandwidth in a manner of being uniformly divided. An intervening RB can be allocated between a group of low contiguous subbands and a group of high subbands among the $$\left\lfloor \frac{N_{RB}}{6} \right\rfloor$$

number of subbands. A position of the intervening RB can be determined according to a system bandwidth. The intervening RB may exist when a size of the remaining band corresponds to a prescribed number. For example, the intervening RB may exist when a size of the remaining band corresponds to the odd number of RBs. The number of the intervening RB may correspond to 1. If the group of high subbands and the group of low subbands include subbands of an identical number, the intervening RB may correspond to a center 1 RB of the system bandwidth.

Among the $$\left\lfloor \frac{N_{RB}}{6} \right\rfloor$$

number of subbands, the number of frequency hopping subbands on which the downlink signal is received can be configured by 2 or 4.

If the downlink signal corresponds to SIB-x (where x>1) except SIB 1 (system information block type 1), the frequency hopping information on the SIB-x can be received via the SIB 1. The SIB 1 can be repeatedly received according to frequency hopping. The frequency hopping information included in the SIB 1 can include information for indicating whether or not frequency hopping for SIB-x is activated and information for indicating a subband on which the SIB-x is transmitted.

The MTC UE repeatedly receives MTC physical downlink control channel (PDCCH) and may be able to repeatedly receive MTC physical downlink shared channel (PDSCH) scheduled by the MTC PDCCH. The MTC PDCCH and the MTC PDSCH can be received via different subframes and frequency hopping subbands different from each other. An initial frequency hopping subband at which repetitive reception of the MTC PDCCH is initiated can be configured by a base station. A subband on which the MTC PDSCH is received can be determined based on a subband on which the MTC PDCCH is received.

Figure 14:
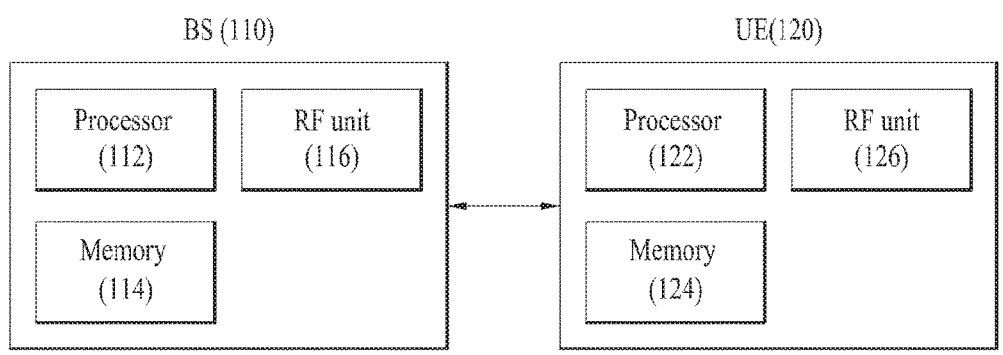
FIG. 14 is a block diagram illustrating a base station and a user equipment according to one embodiment of the present invention.

FIG. 14 shows an example of a base station and a user equipment applicable to embodiment of the present invention.

Referring to FIG. 14, a wireless communication system includes a base station (BS) 110 and a user equipment (UE) 120. In DL, a transmitter is a part of the BS 110 and a receiver is a part of the UE 120. In UL, the transmitter is a part of the UE 120 and the receiver is a part of the BS 110. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

The embodiments of the present invention are mainly explained centering on a data transmission and reception relationship between a user equipment and a base station. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like. And, 'terminal' may be substituted with such a terminology as a UE (user equipment), an MS (mobile station), an MSS (mobile subscriber station) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be applied to a method of performing communication in a wireless communication system supporting MTC and an apparatus therefor.

What is claimed is:

1. A method of receiving a downlink signal by a machine type communication user equipment (MTC UE) in a wireless communication system, the method comprising:
obtaining frequency hopping information on a plurality of subbands contained in a downlink band; and
repeatedly receiving a downlink signal via different subbands based on the frequency hopping information,
wherein the downlink band comprises $$\left\lfloor \frac{N_{RB}}{6} \right\rfloor$$

number of subbands each configured as 6 resource block (RB) size, where '$N_{RB}$' denotes a size of the downlink band, and '$\lfloor \ \rfloor$' denotes a floor function, and
wherein if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

2. The method of claim 1, wherein if the remaining band contains even number RBs, the even number RBs are uniformly distributed to a lowest band and a highest band of the downlink band.

3. The method of claim 1, wherein the intervening RB is allocated between a group of contiguous subbands in a lower part and a group of contiguous subbands in a higher part among the $$\left\lfloor \frac{N_{RB}}{6} \right\rfloor$$

number of subbands.

4. The method of claim 1, wherein a number of frequency hopping subbands on which the downlink signal is received is set to 2 or 4 among the $$\left\lfloor \frac{N_{RB}}{6} \right\rfloor$$

number of subbands.

5. The method of claim 1, wherein if the downlink signal corresponds to a system information block type-x (SIB-x) other than SIB 1, where x>1, the frequency hopping information on the SIB-x is received via the SIB 1.

6. The method of claim 5, wherein:
the SIB 1 is repeatedly received according to frequency hopping, and
the frequency hopping information contained in the SIB 1 indicates whether or not frequency hopping for the SIB-x is activated and a subband on which the SIB-x is transmitted.

7. The method of claim 1, wherein receiving the downlink signal comprises:
repeatedly receiving MTC physical downlink control channel (PDCCH); and
repeatedly receiving MTC physical downlink shared channel (PDSCH) scheduled by the MTC PDCCH,
wherein the MTC PDCCH and the MTC PDSCH are received via different subframes and different frequency hopping subbands.

8. The method of claim 7, wherein:
an initial frequency hopping subband at which repetitive reception of the MTC PDCCH is initiated is configured by a base station and
a subband on which the MTC PDSCH is received is determined based on a subband on which the MTC PDCCH is received.

9. A machine type communication user equipment (MTC UE) in a wireless communication system, comprising:

a processor configured to obtain frequency hopping information on a plurality of subbands contained in a downlink band; and a receiver configured to repeatedly receive a downlink signal via different subbands based on the frequency hopping information, wherein the downlink band comprises $$\left\lfloor \frac{N_{RB}}{6} \right\rfloor$$

number of subbands each configured as 6 resource block (RB) size, where '$N_{RB}$' denotes a size of the downlink band, and '$\lfloor \ \rfloor$' denotes a floor function, and wherein if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

10. A method of transmitting a downlink signal by a base station to a machine type communication user equipment (MTC UE) in a wireless communication system, the method comprising:

transmitting frequency hopping information on a plurality of subbands contained in a downlink band; and repeatedly transmitting the downlink signal via different subbands based on the frequency hopping information, wherein the downlink band comprises $$\left\lfloor \frac{N_{RB}}{6} \right\rfloor$$

number of subbands each configured as 6 resource block (RB) size, where '$N_{RB}$' denotes a size of the downlink band, and '$\lfloor \ \rfloor$' denotes a floor function, and wherein if a remaining band which does not belong to the $$\left\lfloor \frac{N_{RB}}{6} \right\rfloor$$

number of subbands and is smaller than 6 RB size exists in the downlink band, at least one of a lowest index RB, a highest index RB and an intervening RB between subband groups in the downlink band is configured as the remaining band.

11. The method of claim 10, wherein the intervening RB is allocated between a group of contiguous subbands in a lower part and a group of contiguous subbands in a higher part among the $$\left\lfloor \frac{N_{RB}}{6} \right\rfloor$$

number of subbands, and wherein if the remaining band contains even number RBs, the even number RBs are uniformly distributed to a lowest band and a highest band of the downlink band.

12. The method of claim 10, wherein a number of frequency hopping subbands on which the downlink signal is transmitted is set to 2 or 4 among the $$\left\lfloor \frac{N_{RB}}{6} \right\rfloor$$

number of subbands.

13. The method of claim 10, wherein if the downlink signal corresponds to a system information block type-x (SIB-x) other than SIB 1, where x>1, the frequency hopping information on the SIB-x is transmitted via the SIB 1.

14. The method of claim 13, wherein:

the SIB 1 is repeatedly transmitted according to frequency hopping, and the frequency hopping information contained in the SIB 1 indicates whether or not frequency hopping for the SIB-x is activated and a subband on which the SIB-x is transmitted.

15. The method of claim 10, wherein transmitting the downlink signal comprises:

repeatedly transmitting MTC physical downlink control channel (PDCCH); and repeatedly transmitting MTC physical downlink shared channel (PDSCH) scheduled by the MTC PDCCH, wherein the MTC PDCCH and the MTC PDSCH are transmitted via different subframes and frequency hopping different subbands.

16. The method of claim 15, wherein an initial frequency hopping subband at which repetitive transmission of the MTC PDCCH is initiated is configured by the base station, and wherein a subband on which the MTC PDSCH is transmitted is determined based on a subband on which the MTC PDCCH is transmitted.

* * * * *